(12) United States Patent
Gunawan et al.

(10) Patent No.: US 11,500,610 B2
(45) Date of Patent: Nov. 15, 2022

(54) TRANSMISSION CONTROL FOR AUDIO DEVICE USING AUXILIARY SIGNALS

(71) Applicant: Dolby Laboratories Licensing Corporation, San Francisco, CA (US)

(72) Inventors: David Gunawan, Sydney (AU); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/259,543

(22) PCT Filed: Jul. 10, 2019

(86) PCT No.: PCT/US2019/041219
§ 371 (c)(1),
(2) Date: Jan. 11, 2021

(87) PCT Pub. No.: WO2020/014371
PCT Pub. Date: Jan. 16, 2020

(65) Prior Publication Data
US 2021/0232360 A1    Jul. 29, 2021

Related U.S. Application Data

(60) Provisional application No. 62/697,010, filed on Jul. 12, 2018.

(30) Foreign Application Priority Data

Jul. 12, 2018   (EP) ..................................... 18183034

(51) Int. Cl.
*G06F 3/16* (2006.01)
*G10L 21/034* (2013.01)
(Continued)

(52) U.S. Cl.
CPC ............ *G06F 3/165* (2013.01); *G10L 21/034* (2013.01); *G10L 25/51* (2013.01); *G10L 25/78* (2013.01); *H04R 1/08* (2013.01)

(58) Field of Classification Search
CPC . G10L 2021/02082; G10L 2021/02165; G10L 21/0208; G10L 21/0216;
(Continued)

(56) References Cited

U.S. PATENT DOCUMENTS 8,041,026 B1 * 10/2011 Coughlan ........... G10L 21/0208
379/392.01
8,880,119 B1 * 11/2014 Naghdi ................ G08B 25/008
455/457

(Continued)

FOREIGN PATENT DOCUMENTS

JP        2009503568 A    1/2009
KR   20120125986 A    11/2012
(Continued)

*Primary Examiner* — Lun-See Lao

(57) ABSTRACT

An apparatus and method of transmission control for an audio device. The audio device uses sources other than the microphone to determine nuisance, and uses this to calculate a gain as well as to make the transmit decision. Using the gain results in a more nuanced nuisance mitigation than using the transmit decision on its own.

22 Claims, 4 Drawing Sheets

(51) Int. Cl.
*G10L 25/51* (2013.01)
*G10L 25/78* (2013.01)
*H04R 1/08* (2006.01)

(58) Field of Classification Search
CPC ....... G10L 21/034; G10L 25/51; G10L 25/78; H04M 1/72412; H04M 2203/509; H04M 2250/62; H04M 3/56; H04M 3/568; H04R 1/1083; H04R 1/406; H04R 2420/07; H04R 3/005; H04R 3/04; H04R 1/08; H04W 4/16; H04W 88/16; G10K 11/175; G10K 11/17823; G10K 11/17825; G10K 11/1785; G10K 11/17853; G10K 11/17854; G10K 11/17857; G10K 11/17879; G10K 2210/3025; G10K 2210/3032; G10K 2210/3045; G10K 2210/3051; G10K 2210/503
USPC ......... 381/56–58, 104–107; 704/225; 700/94
See application file for complete search history.

(56) References Cited

U.S. PATENT DOCUMENTS

| | | | |
|---|---|---|---|
| 9,332,368 | B1 | 5/2016 | Hershenson |
| 9,363,596 | B2 | 6/2016 | Dusan |
| 9,373,343 | B2* | 6/2016 | Dickins ................. G10L 25/84 |
| 2005/0114124 | A1 | 5/2005 | Liu |
| 2010/0145689 | A1 | 6/2010 | Li |
| 2012/0288079 | A1* | 11/2012 | Burnett ................... H04R 3/04 |
| | | | 379/202.01 |
| 2015/0032446 | A1* | 1/2015 | Dickins ................. G10L 25/84 |
| | | | 704/233 |
| 2015/0215467 | A1 | 7/2015 | Shue |
| 2017/0070615 | A1 | 3/2017 | Cartwright |
| 2018/0262847 | A1* | 9/2018 | Pedersen .............. H04R 25/407 |
| 2020/0213726 | A1* | 7/2020 | Dyrholm ................ H04R 3/005 |

FOREIGN PATENT DOCUMENTS

| | | | | |
|---|---|---|---|---|
| KR | 20130101152 A | | 9/2013 | |
| KR | 101551666 B1 | | 9/2015 | |
| KR | 20160051785 A | | 5/2016 | |
| KR | 101704926 B1 | | 2/2017 | |
| WO | 2013142659 | | 9/2013 | |
| WO | WO 2013/142659 | * | 9/2013 | ............ G10L 25/78 |
| WO | 2017146970 A1 | | 8/2017 | |

* cited by examiner

TRANSMISSION CONTROL FOR AUDIO DEVICE USING AUXILIARY SIGNALS

CROSS REFERENCE TO RELATED APPLICATIONS

This application claims priority to U.S. Provisional Application No. 62/697,010, filed Jul. 12, 2018 and European Patent Application No. 18183034.0, filed Jul. 12, 2018, each of which is incorporated by reference in its entirety herein.

BACKGROUND

The present invention relates to audio processing, and in particular, to transmission control for telecommunication systems.

Unless otherwise indicated herein, the approaches described in this section are not prior art to the claims in this application and are not admitted to be prior art by inclusion in this section.

Voice activity detection (VAD) is a technique for determining a binary or probabilistic indicator of the presence of voice in a signal containing a mixture of voice and noise. Often the performance of voice activity detection is based on the accuracy of classification or detection. Research work is motivated by the use of voice activity detection algorithms for improving the performance of speech recognition or for controlling the decision to transmit a signal in systems benefiting from an approach to discontinuous transmission. Voice activity detection is also used for controlling signal processing functions such as noise estimation, echo adaption and specific algorithmic tuning such as the filtering of gain coefficients in noise suppression systems.

The output of voice activity detection may be used directly for subsequent control or meta-data, and/or be used to control the nature of audio processing algorithms working on the real time audio signal.

One particular application of interest for voice activity detection is in the area of transmission control. For communication systems where an endpoint may cease transmission, or send a reduced data rate signal during periods of voice inactivity, the design and performance of a voice activity detector is critical to the perceived quality of the system. Such a detector must ultimately make a binary decision, and is subject to the fundamental problem that in many features observable on a short time frame, to achieve low latency, there are characteristics of speech and noise that substantially overlap. Hence, such a detector must constantly face a tradeoff between the prevalence of false alarms and the possibility of lost desired speech due to incorrect decisions. The opposing requirements of low latency, sensitivity and specificity have no completely optimal solution, or at least create an operational landscape where the efficiency or optimality of a system is dependent on the application and expected input signal.

U.S. Application Pub. No. 2015/0032446 discusses a system that combines a short-term voice activity detection with a longer-term aggregation of audio features in order to make a transmission control decision.

U.S. Application Pub. No. 2010/0145689 discusses using keystroke event detection along with auditory detection of keystrokes in order to suppress the keystroke noise during speech segments.

SUMMARY

One problem with many existing systems is that they consider mainly acoustic information collected using the microphone. There is a need for a system that detects nuisance using components other than the microphone.

Another problem with many existing systems is that they consider each nuisance event individually in order to reduce the impact of each respective nuisance event within the auditory signal. There is a need for a system that aggregates nuisance events in order to make a more nuanced nuisance decision.

Given the above problems and lack of solutions, the embodiments described herein are directed toward aggregating nuisance events over time, and controlling a gain of the transmission in addition to the transmission decision itself.

According to an embodiment, a method performs transmission control for an audio device. The method includes receiving an audio input using a microphone. The method further includes receiving an auxiliary input using a source other than the microphone. The method further includes performing voice activity detection on the audio input to generate a voice activity confidence level. The method further includes aggregating the auxiliary input over time to generate a nuisance level. The method further includes combining the voice activity confidence level and the nuisance level to generate a transmit decision level and a gain level.

When the transmit decision level indicates a transmission, the method further includes applying the gain level to the audio input to result in a modified audio input, and transmitting the modified audio input.

The auxiliary input may be a plurality of auxiliary inputs, and the source other than the microphone may be a plurality of sources other than the microphone.

The source other than the microphone may be one of a vibration sensor, a system event log, an accelerometer, a component activity log, and a secondary input log. The system event log may log keyboard press events and mouse click events. The audio device may include a fan, and the component activity log may log a fan speed of the fan. The secondary input log may log information related to a connected device that is connected to the audio device.

Combining the voice activity confidence level and the nuisance level may include combining the voice activity confidence level, the nuisance level and a far end activity level to generate the transmit decision level and the gain level.

The gain level may be a linear combination of the voice activity confidence level and the nuisance level.

The nuisance level may be a plurality of nuisance levels. The gain level may be a linear combination of the voice activity confidence level and the plurality of nuisance levels.

According to another embodiment, a non-transitory computer readable medium stores a computer program that, when executed by a processor, controls an apparatus to execute processing including one or more of the methods discussed above.

According to another embodiment, an apparatus performs transmission control for an audio device. The apparatus includes a microphone, a source other than the microphone, a processor, and a memory. The processor is configured to control the audio device to receive an audio input using the microphone. The processor is further configured to control the audio device to receive an auxiliary input using the source other than the microphone. The processor is further configured to control the audio device to perform voice activity detection on the audio input to generate a voice activity confidence level. The processor is further configured to control the audio device to aggregate the auxiliary input over time to generate a nuisance level. The processor is further configured to control the audio device to combine the voice activity confidence level and the nuisance level to generate a transmit decision level and a gain level.

The apparatus may further include a transmitter. When the transmit decision level indicates a transmission, the processor is further configured to control the audio device to apply the gain level to the audio input to result in a modified audio input, and to control the transmitter to transmit the modified audio input.

The apparatus may further include a keyboard, and the source other than the microphone may be a system event log that logs keyboard press events.

The apparatus may further include a fan, and the source other than the microphone may be a component activity log that logs a fan speed of the fan.

The apparatus may include similar details to those discussed above regarding the method.

The following detailed description and accompanying drawings provide a further understanding of the nature and advantages of various implementations.

DETAILED DESCRIPTION

Described herein are techniques for binaural audio processing. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

This document uses the term "nuisance". In general, the term nuisance is used to refer to an input that differs from the desired input of the system. The desired input of the system will vary depending upon the embodiment, which will also affect what is classified as nuisance. For example, for a communications endpoint, the desired input is generally speech; the nuisance is other sounds that may be misclassified as speech or that negatively impact the speech. Nuisance is judged by how it would adversely impact the desired application. In teleconferencing environments, nuisance is often injected when someone is not speaking; if they are at least trying to speak or being the important part of the meeting, even nuisance sounds may be acceptable, and not so much a nuisance. The main nuisance at a teleconferencing endpoint is sound leaking in when someone is not talking. Many systems do not give feedback to the person making a nuisance—in fact they are the only person who cannot hear the nuisance and therefore are ironically unaware they are a nuisance. In many cases, the unwanted sounds come from the silent user—thus this idea of nuisance.

Figure 1:
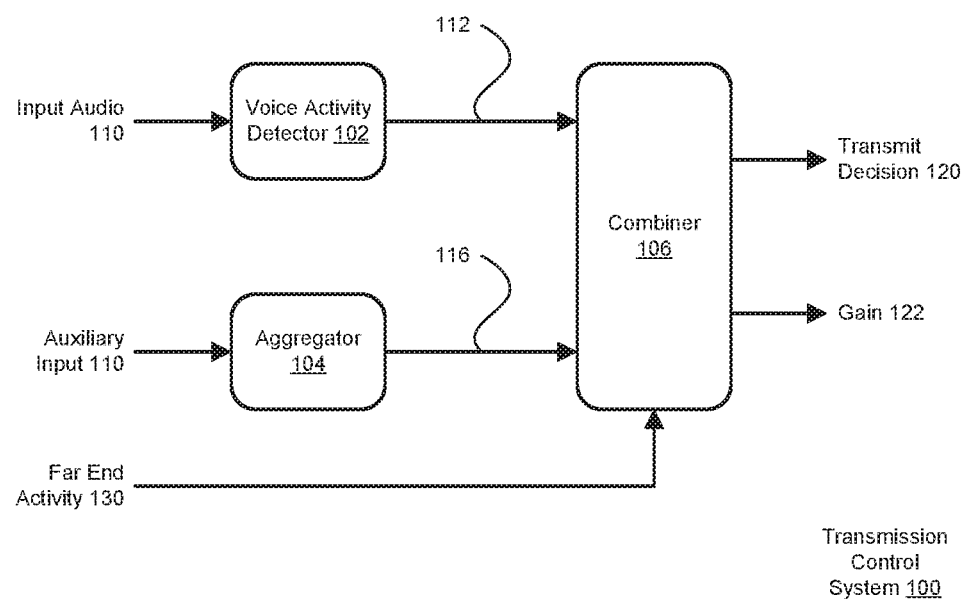
FIG. 1 is a block diagram of a transmission control system 100.

FIG. 1 is a block diagram of a transmission control system 100. The transmission control system 100 includes a voice activity detector 102, an aggregator 104, and a combiner 106. The transmission control system 100 may be implemented as a component of an audio device, such as a laptop computer, a communications endpoint (e.g., a speakerphone), etc. The audio device may include other components which (for brevity) are not shown.

The voice activity detector 102 receives an audio input 110, performs voice activity detection on the audio input 110, and generates a voice activity confidence level 112 of the audio input 110. The audio input 110 may be captured by another component of the audio device, such as a microphone (not shown). The voice activity detector 102 provides the voice activity confidence level 112 to the combiner 106. The voice activity confidence level 112 may range between 0 and 1, with 0 indicating a low (or no) likelihood of detected voice activity, and 1 indicating a high likelihood of detected voice activity.

The aggregator 104 receives an auxiliary input 114, aggregates the auxiliary input 114 over time, and generates a nuisance level 116 based on the auxiliary input 114 having been aggregated. The aggregator 104 provides the nuisance level 116 to the combiner 106.

In general, the auxiliary input 114 corresponds to an input from a component of the audio device other than the microphone. These other components include sensors as well as event logs from the components of the audio device (other than the microphone). As such, the number of auxiliary inputs will vary depending upon the details of the audio device. For example, for a laptop computer embodiment that includes a keyboard and a fan, the auxiliary inputs may include event logs from the keyboard (indicating key clicks) and device activity logs from the fan (e.g., containing fan speed data). Further details of the auxiliary inputs are provided in subsequent sections.

The auxiliary input 114 may be a plurality of auxiliary inputs, and the aggregator 104 may aggregate each of the plurality of auxiliary inputs. The aggregator 104 may be a plurality of aggregators, each aggregating a respective one of the plurality of auxiliary inputs. The nuisance level 116 may be a plurality of nuisance levels, each corresponding to a respective one of the plurality of auxiliary inputs. (To avoid cluttering the figure, the auxiliary input 114, the aggregator 104 and the nuisance level 116 are shown once, but may be considered to be plural elements.) The aggregator 104 may provide the plurality of nuisance levels to the combiner 106 as individual nuisance levels, or may combine them into a combined nuisance level.

The combiner 106 combines the voice activity confidence level 112 and the nuisance level 116 to generate a transmit decision level 120 and a gain level 122. (The transmit decision level 120 and the gain level 122 are provided to the other components of the audio device, to control its further operation.) The transmit decision level 120 may be a binary value, where "0" indicates the audio input 110 is not to be transmitted, and "1" indicates the audio input 110 is to be transmitted. In general, when the voice activity confidence level 112 is high and the nuisance level 116 is low, the transmit decision level 120 indicates that the audio input 110 is to be transmitted. When the voice activity confidence level 112 is low and the nuisance level 116 is high, the transmit decision level 120 indicates that the audio input 110 is not to be transmitted.

The gain level 122 corresponds to a gain to be applied to the audio input 110. In general, a gain may be positive (an increase, or boost) or negative (a decrease, or attenuation). Here, the gain level 122 is generally an attenuation. The gain level 122 enables more nuanced control over the transmission of the audio input 110 than just using the transmit decision level 120. For example, when the voice activity confidence level 112 is neither high nor low, a high nuisance level 116 may result in the gain level 122 being high, and a low nuisance level 116 may result in the gain level 122 being low. By operating based on both the voice activity of the input audio 110 and the aggregated auxiliary input 114, and by generating both the transmit decision level 120 and the gain level 122, the combiner 106 performs a more nuanced nuisance decision than many existing systems.

This nuanced decision includes a number of factors. One factor is that the transmission control system 100 uses a time period that is longer than the time period used for detection of individual nuisance events. This improves the categorization of the individual nuisance events by also accounting for the nature of the other activity, its context and meaning in terms of the ongoing conference or interactivity across other conference participants. Rather than act suddenly on individual nuisance sound events to remove each one, by using this approach the transmission control system 100 moves with more certainty to either remove or return the participant to the conference based on the extent to which they are communicating co-operatively or being an apparent audio nuisance, which is typical for the case of noises coming through in the absence of ongoing speech.

(Note that even when the auxiliary input 114 corresponds to events that may also be detected by the microphone (e.g., keyboard press events that are also loud), the aggregation means that the individual key press events are not directly removed from the audio input 110, as is the case in many existing systems.)

The combiner 106 may also generate the transmit decision level 120 and the gain level 122 based on a far end activity level 130. The far end activity level 130 may be a binary value, where "1" indicates far end activity, and "0" indicates no far end activity; or the far end activity level 130 may range between 0 and 1. The far end activity level 130 may be based on the activity, signal, or features derived from the far end. For example, consider the presence of significant signal on the incoming signal or far end activity. In such cases, activity at the local endpoint is more likely to represent nuisance, particularly if there is no pattern or associated relationship that would be expected of a natural conversation or voice interaction. For example, voice onset should occur after or near the end of activity from the far end. Short bursts occurring where the far end activity level 130 indicates significant and continued voice activity may indicate a nuisance condition.

The specific details of how the combiner 106 combines the voice activity confidence level 112, the nuisance level 116 and the far end activity level 130 may vary depending upon the particular embodiment of the audio device that includes the transmission control system 100; these specific details are elaborated in subsequent sections. In brief, the combiner 106 determines the overall decision to transmit (the transmit decision level 120), and additionally outputs a gain at each block (the gain level 122) to be applied to the outgoing audio. The gain is present to achieve one or more of two functions. The first function is to achieve natural voice phrasing where the signal returns to silence before and after the identified voice segment. This involves a degree of fading in (usually on the order of 20-100 ms) and a degree of fading out (usually in the order of 100-2000 ms). In one embodiment a fade in of 10 ms (or single block) and a fade out of 300 ms can be effective. The second function is to reduce the impact of transmitted frames that occur in the nuisance condition, where it is likely, due to recent accumulated statistics, that the voice frame onset detection is associated with an unvoiced non-stationary noise event or other disturbance.

Figure 2:
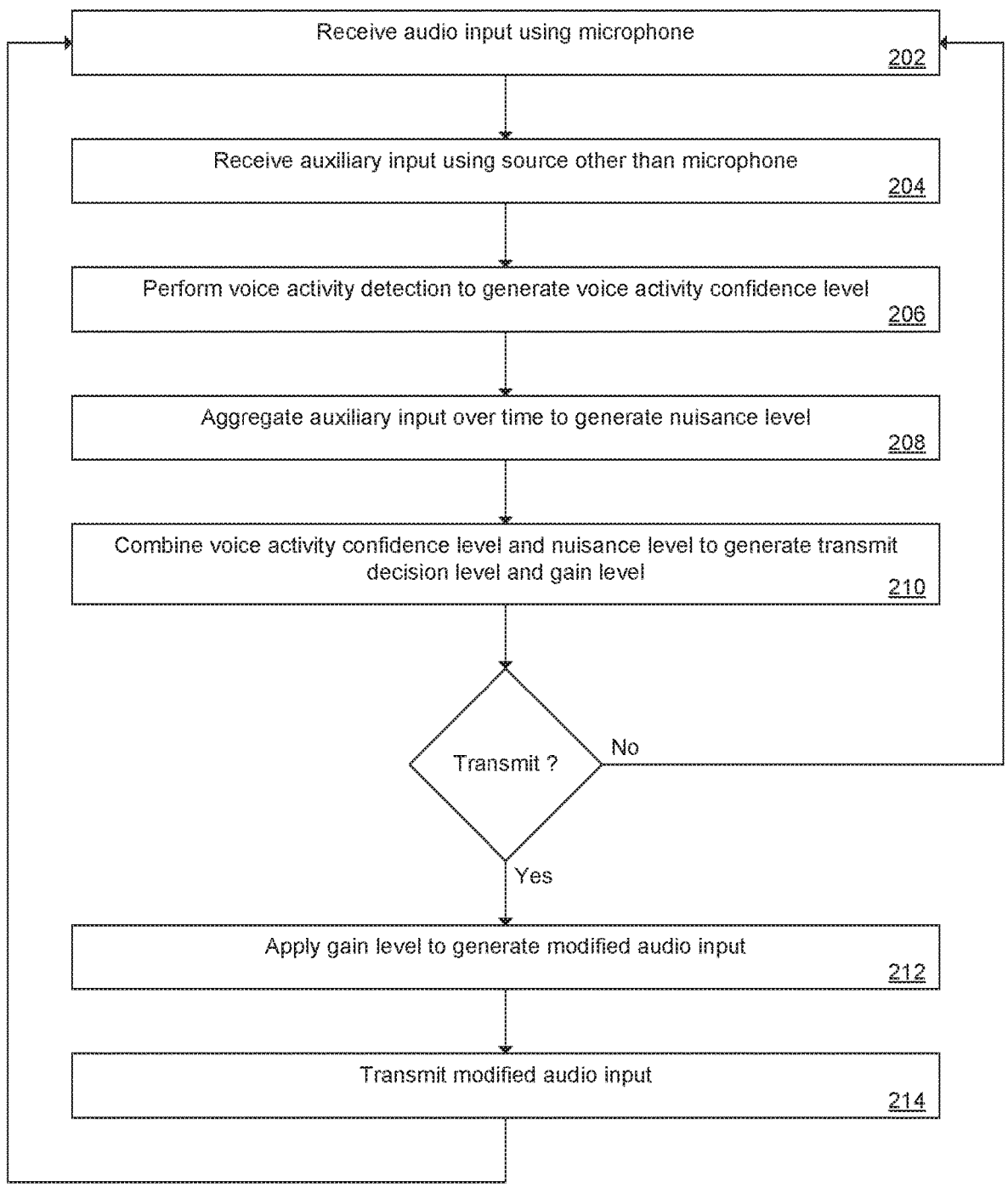
FIG. 2 is a flowchart of a method 200 of transmission control for an audio device.

FIG. 2 is a flowchart of a method 200 of transmission control for an audio device. The method 200 may be performed by the transmission control system 100 (see FIG. 1), or by an audio device that includes the transmission control system 100. The method 200 may be implemented by a processor that executes one or more computer programs that correspond to one or more of the method steps, to control the operation of the transmission control system 100.

At 202, an audio input is received using a microphone. As an example, a speakerphone includes a microphone, and receives an audio input corresponding to nearby sounds using the microphone.

At 204, an auxiliary input is received using a source other than the microphone. As discussed above, the auxiliary input may be a plurality of auxiliary inputs from a plurality of sources other than the microphone. As an example, a laptop computer may include a keyboard, and the source is an event log that logs key presses; the auxiliary input 114 is the key presses. As another example, the laptop computer may also include a fan, and the second source is a device activity log that logs the operational parameters of the fan; the second auxiliary input 114 is the fan speed.

At 206, voice activity detection is performed on the audio input to generate a voice activity confidence level. For example, the voice activity detector 102 (see FIG. 1) may perform voice activity detection on the audio input 110 to generate the voice activity confidence level 112.

At 208, the auxiliary input is aggregated over time to generate a nuisance level. For example, the aggregator 104 (see FIG. 1) may aggregate the auxiliary input 114 over time to generate the nuisance level 116. As mentioned above, the auxiliary input may be a plurality of auxiliary inputs, and the nuisance level 116 may be a plurality of nuisance levels.

At 210, the voice activity confidence level and the nuisance level are combined to generate a transmit decision level and a gain level. For example, the combiner 106 (see FIG. 1) may combine the voice activity confidence level 112 and the nuisance level 116 to generate the transmit decision level 120 and the gain level 122.

As a further option, a far end activity level may be combined with the voice activity confidence level and the nuisance level to generate the transmit decision level and the gain level. For example, the combiner 106 (see FIG. 1) may receive the far end activity level 130, and may include the far end activity level 130 in its combination process to result in the transmit decision level 120 and the gain level 122.

When the transmit decision level does not indicate a transmission (e.g., it is 0), the method returns to 202. When the transmit decision level indicates a transmission (e.g., it is 1), the method continues to 212 and 214. As an example, the audio device may receive the transmit decision level 120 (see FIG. 1) from the transmission control system 100.

At 212, the gain level is applied to the audio input to result in a modified audio input. As an example, an audio device (that includes the transmission control system 100 of FIG. 1) may apply the gain level 122 to the audio input 110 to result in a modified audio input.

At 214, the modified audio input is transmitted. As an example, an audio device (that includes the transmission control system 100 of FIG. 1) may transmit the modified audio input.

By aggregating the auxiliary input (or multiple auxiliary inputs) to measure nuisance over time, and by generating and applying a gain (based on the nuisance over time) to the audio input, embodiments implement a more nuanced transmission control process.

Figure 3:
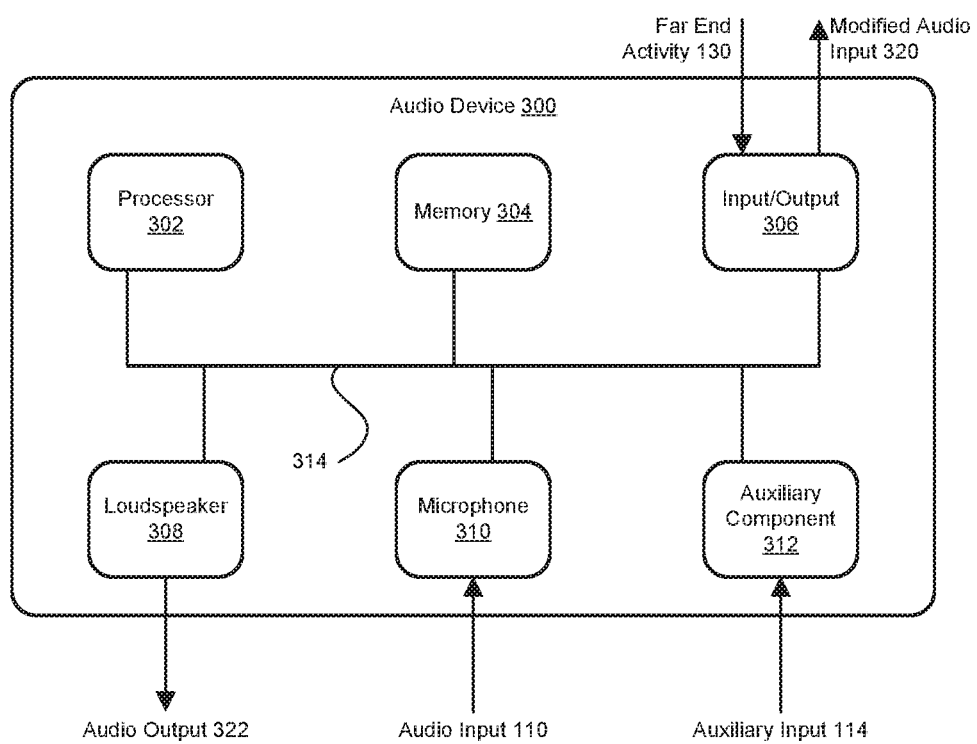
FIG. 3 is a block diagram of an audio device 300.

FIG. 3 is a block diagram of an audio device 300. The audio device 300 may implement the transmission control system 100 (see FIG. 1), or may perform one or more of the steps of the method 200 (see FIG. 2). Examples of the audio device 300 include a communications endpoint (e.g., a speakerphone), a laptop computer, a mobile telephone, a headset with speakers and a microphone, an earpiece with a speaker and a microphone, etc. The audio device 300 includes a processor 302, a memory 304, an input/output interface 306, a loudspeaker 308, a microphone 310, and an auxiliary component 312, connected by a bus 314. The audio device 300 may include other components that (for brevity) are not shown.

The processor 302 generally controls the operation of the audio device 300. The processor 302 may implement the functionality of the transmission control system 100 (see FIG. 1). For example, the processor may perform the voice activity detection function of the voice activity detector 102 (see FIG. 1), the aggregation function of the aggregator 104, and the combination function of the combiner 106. The processor 302 may control the audio device 300 to perform one or more steps of the method 200 (see FIG. 2), for example by executing one or more computer programs.

The memory 304 generally stores data generated by and used by the audio device 300. This data may include the computer programs executed by the processor 302, data corresponding to the input and output signals of the audio device 300 (e.g., the audio input 110), data generated during the operation of the audio device 300 (e.g., the auxiliary input 114), intermediate data generated by the audio device 300 (e.g., the voice activity confidence level 112, the nuisance level 116, the transmit decision level 120, and the gain level 122), etc.

The input/output interface 306 generally interfaces the audio device 300 to other devices and exchanges signals between the audio device 300 and the other devices. For example, the input/output interface 306 receives the far end activity level 130, and transmits the modified audio input 320. For example, when the audio device 300 is a communications endpoint (e.g., a speakerphone), the far end activity level 130 is received from one or more remote communications endpoints; and the modified audio input 320 corresponds to the audio input 110 modified by the gain 122, for output by the one or more remote communications endpoints. The input/output interface 306 may also exchange other signals with the other devices; for example, the other devices may transmit the audio signals that they have captured, for the audio device 300 to output from the loudspeaker 308. The input/output interface 306 may include a wired or wireless transmitter.

The loudspeaker 308 generally outputs an audio output 322 of the audio device 300. For example, when the audio device 300 is a communications endpoint, the audio output 322 includes the audio signals received from remote communications endpoints via the input/output interface 306. As another example, when the audio device 300 is a headset, the audio output 322 includes a sidetone corresponding to the modified audio input 320 (since the sidetone helps the user perceive that the connection is active).

The microphone 310 generally captures audio in the vicinity of the audio device 300, including the audio input 110.

The auxiliary component 312 generally generates the auxiliary input 114. As discussed above, the auxiliary component 312 may be a sensor or another component of the audio device 300. The auxiliary input 114 may be a consequence of the operation of the auxiliary input 114 (e.g., for a component), or may be the output itself of the auxiliary component (e.g., for a sensor). For example, when the auxiliary component 312 is a keyboard, the auxiliary input 114 corresponds to key press data (that may be stored in a log by the memory 304). As another example, when the auxiliary component 312 is a vibration sensor, the auxiliary input 114 corresponds to sensor data (that may be stored in a log by the memory 304) of the vibration of the audio device 300.

Although only one of each component of the audio device 300 has been shown in FIG. 3, such description is mainly for ease of illustration. The number of components of the audio device 300 may be adjusted as desired according to the form factor of the embodiment. For example, the auxiliary component 312 may be multiple auxiliary components, such as a keyboard, a fan, and an accelerometer.

The arrangements of the components of the audio device may be adjusted as desired according to the form factor of the embodiment. For example, the audio device 300 may include two devices such as a mobile telephone and a headset.

Figure 4:
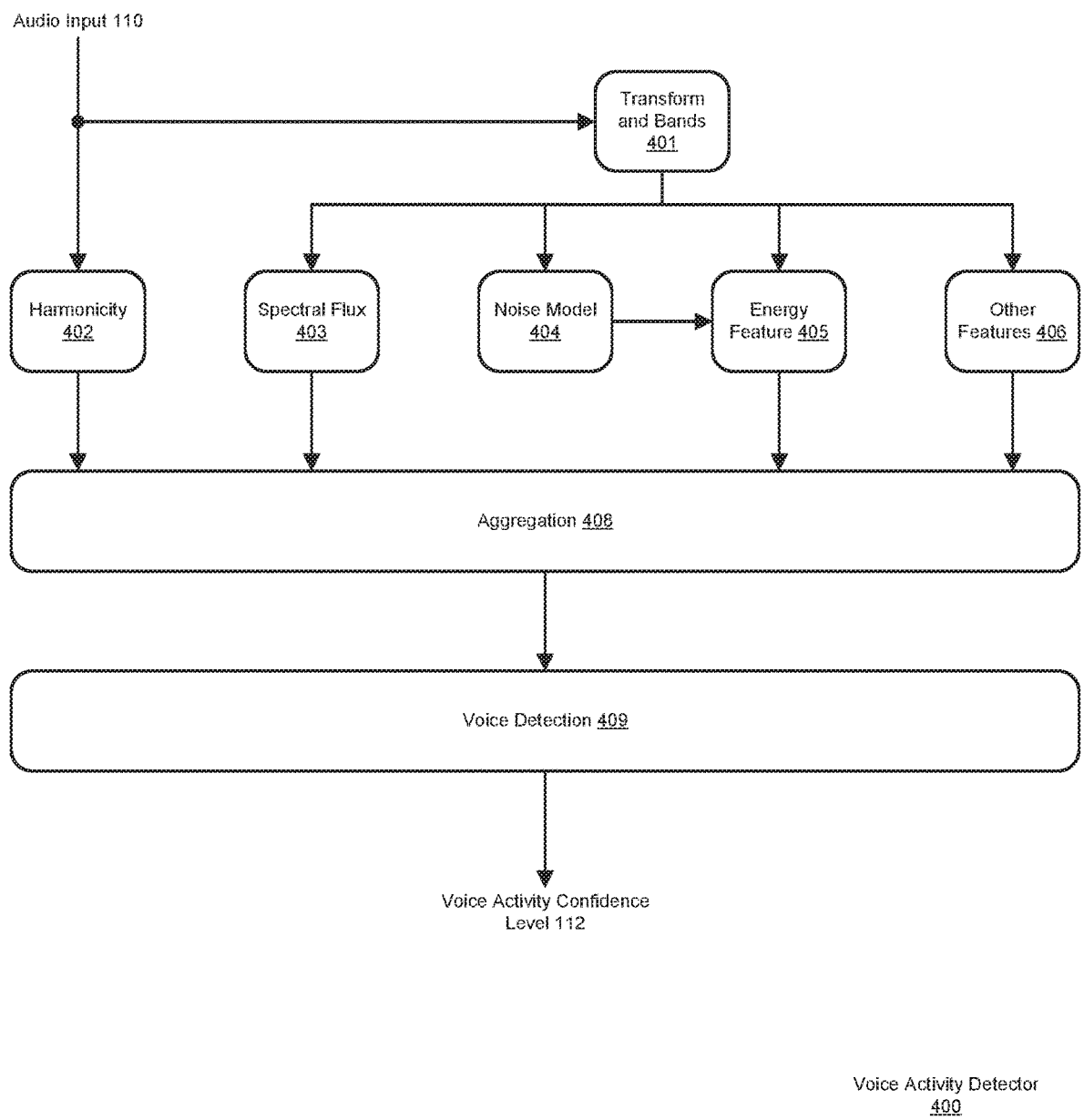
FIG. 4 is a block diagram of a voice activity detector 400.

FIG. 4 is a block diagram of a voice activity detector 400. The voice activity detector may be used as the voice activity detector 102 (see FIG. 1) in an embodiment. In other embodiments, the details of the voice activity detector 102 may differ from those shown in FIG. 4; the main concern is that the voice activity detector 102 generates the voice activity confidence level 112, which may be done in ways other than the way shown in FIG. 4. However, the details shown in FIG. 4 provide a robust result for the voice activity confidence level 112. In general, the voice activity detector 400 uses an aggregation of features and the additional creation of statistics from these features across a larger interval (several blocks or frames, or online averaging), and applies a rule using these features is used to indicate the presence of voice, with some latency. The voice activity detector 400 includes a transform and bands block 401, a harmonicity block 402, a spectral flux block 403, a noise model block 404, an energy feature block 405, an other features block 406, an aggregation block 408, and a voice detection block 409.

The transform and bands block 401 uses a frequency based transform and a set of perceptually spaced bands for representing the signal spectral power of the audio input 110. An initial block size or sampling of the transform sub-band for voice is for example in the range of 8 to 160 ms, with a value of 20 ms useful in one particular embodiment.

The harmonicity block 402 extracts harmonicity features from the audio input 110, and provides the extracted harmonicity features to the aggregation block 408. The spectral flux block 403 extracts spectral flux features from the audio input 110, and provides the extracted spectral flux features to the aggregation block 408.

The noise model block 404 aggregates a longer term feature of the audio input 1101, however this is not used directly. Rather the instantaneous spectra in bands is compared against the noise model to create an energy measure that is provided to the aggregation block 408.

The energy feature block 405 extracts energy features from the audio input 110, and provides the extracted energy features to the aggregation block 408.

The other features block 406 extracts some features other than those processed by the other blocks. These other features may be selected based on the particular embodiment, or other design criteria. Examples of the other features include the normalized spectra of the audio input 110 and the absolute energy of the audio input 110.

The aggregation block 408 collects, filters or aggregates the data from the short features associated with a single block, to create a set of features and statistics that are then used again as features to an additional trained or tuned rule. In an example, aggregation block 408 stacks the data and mean and variance. Alternatively, the aggregation block 408 may use online statistics (e.g., Infinite Impulse Response IIR for mean and variance).

The voice detection block 409 creates a delayed decision about the presence of voice across a larger region of audio input to generate the voice activity confidence level 112. An example size for the frame or time constant of the statistics is of the order of 240 ms, with values in the range of 100 to 2000 ms being applicable. This output is used to control the continuation or completion of a frame of audio based on the presence or absence of voice after the initial onset. The voice detection block 409 is more specific and sensitive than an onset rule, as it is afforded the latency and additional information in the aggregated features and statistics.

The details of the voice activity detector 400 may otherwise be as described in U.S. Application Pub. No. 2015/0032446.

Auxiliary Components and Auxiliary Inputs

As discussed above (regarding the auxiliary input 114 of FIG. 1, the step 204 of FIG. 2, the auxiliary component 312 of FIG. 3, etc.), there may be a number of types of auxiliary components that may generate a number of types of auxiliary inputs. These auxiliary inputs differ from the audio input 110 (e.g., in that they are not directly captured by the microphone), yet may still contribute to, or be indicative of, nuisance. The auxiliary inputs may be stored in one or more event logs. The auxiliary inputs may include vibration data, system event data, acceleration data, component activity data, and secondary device data.

Vibration data corresponds to data generated by a vibration sensor. For example, when the auxiliary component 312 (see FIG. 3) is a vibration sensor, the vibration data corresponds to vibration of the audio device 300. In general, the vibration data corresponds to mechanical vibrations that differ from the vibrations caused by voice, and thus differ from the signals captured by a microphone. For example, if the audio device 300 is on a table and someone is tapping the table, this mechanical vibration is sensed by the vibration sensor. The vibration sensor may be a piezoelectric sensor.

System event data corresponds to events related to the operation of the components of the audio device 300. For example, for a laptop computer that includes a keyboard, the system event data corresponds to keyboard press events, e.g. as captured by the keyboard driver system or system basic input/output operating system (BIOS). Similarly, for a mouse, the system event data corresponds to mouse click events. Note that although the consequences of the system events may also be detected by the microphone (e.g., when the typing is loud), the system event data being aggregated is not sourced from the microphone.

Acceleration data corresponds to data generated by an accelerometer. As an example, if the audio device 300 is in heavy motion, this may be indicative more of a nuisance state (e.g., wind noise, etc.) than a voice transmission state. Similarly, if the audio device 300 is dropped on the floor, the acceleration data will be more indicative of a nuisance state than a voice transmission state.

Component activity data corresponds to activity data of the components of the audio device 300 that may generate nuisance. One example is a fan, for which the component activity data indicates activity such as the fan speed. Another example is a hard disk drive, for which the component activity data indicates activity such as whether the drive is spinning, performing data access, etc. Similarly to the system event data, the component activity data may be captured by the component drivers or the system BIOS.

Secondary device data corresponds to activity of components that are separate from, but related to, the audio device 300. For example, a laptop computer (the audio device 300) may be connected to a projector for projecting the laptop's screen; a projector often runs a fan during its operation, so the secondary device data may indicate that the projector is connected, or that the projector's fan is active. As another example, a communications endpoint (the audio device 300) may be connected to a keyboard; the secondary device data may indicate that the keyboard is connected, or that keyboard press events are occurring (similarly to the system event data).

Aggregation and Combination

As discussed above (e.g., concerning the aggregator 104 of FIG. 1, the step 208 in FIG. 2, etc.), the auxiliary input 114 is aggregated over time to generate the nuisance level 116. The combiner 106 (see FIG. 1) may work with the aggregator 104 to perform the aggregation. The parameters of the aggregation generally include an increment amount, a decrement amount, and a decay time. The aggregation of the nuisance level 116 may also be based on additional parameters, such as whether a talk burst has ended. The values of these parameters are generally configured according to the particulars of the auxiliary inputs and the audio device, and may be adjusted as desired.

For example, the nuisance level 116 may range between a minimum value and a maximum value. The nuisance level 116 starts at the minimum value. Each event present in the auxiliary input 114 increases the nuisance level 116 by the increment amount (but no higher than the maximum value). After each interval of the decay time, the nuisance level 116 is decreased by the decrement amount (but no lower than the minimum value).

A specific example for when the auxiliary input 114 corresponds to keyboard presses is as follows. The nuisance level 116 may range between 0 and 1, may be incremented by 0.2 for each keyboard press event (as provided by the auxiliary input 114), and may decay with a time constant of 10 seconds. In addition, at the end of a talk burst with a high level of voice activity (e.g., as indicated by the voice activity confidence level 112 being greater than 60%), the decay time (decay constant) is shortened to 1 second.

Another specific example for when the auxiliary input 114 corresponds to vibration is as follows. The nuisance level 116 may range between 0 and 1, may be incremented by 0.1 each time the vibration measurement (as provided by the auxiliary input 114) exceeds a defined threshold, and may decay with a time constant of 10 seconds.

Another specific example for when the auxiliary input 114 corresponds to acceleration is as follows. The nuisance level 116 may range between 0 and 1, may be incremented by 0.1 each time the acceleration measurement (as provided by the auxiliary input 114) exceeds a defined threshold, and may decay with a time constant of 10 seconds.

Another specific example for when the auxiliary input 114 corresponds to fan speed is as follows. The nuisance level 116 may range between 0 and 1; a fan speed value (as provided by the auxiliary input 114) below a first threshold corresponds to 0, a fan speed value above a second threshold corresponds to 1, and a fan speed value between the first threshold and the second threshold is linearly mapped between 0 and 1.

As mentioned above, the auxiliary input 114 (see FIG. 1) may be one of a number of auxiliary inputs. For example, the auxiliary component 312 (see FIG. 3) may be one of a number of auxiliary components, each generating a corresponding auxiliary input 114. The aggregator 104 may implement one or more of a number of options regarding the multiple auxiliary inputs. One option is that the aggregator 104 may aggregate the multiple auxiliary inputs into corresponding multiple nuisance levels that it provides to the combiner 106. Another option is that the aggregator 104 may combine one or more of the multiple nuisance levels into a combined nuisance level that it provides to the combiner 106. For example, if the aggregator 104 receives a first auxiliary input and a second auxiliary input, and generates a first nuisance level and a second nuisance level, the aggregator may linearly combine the first and second nuisance levels to generate a combined nuisance level. Another option is that the aggregator 104 provides the maximum nuisance level of the multiple nuisance levels as the nuisance level 116.

As discussed above, the combiner 106 (see FIG. 1) combines the voice activity confidence level 112 and the nuisance level 116 to generate the transmit decision level 120 and the gain level 122. For example, when the voice activity confidence level 112 is high (e.g., above 80%) and the nuisance level 116 is low (e.g., below 20% [0.2 when the range is 0 to 1]), the transmit decision level 120 indicates that the audio input 110 is to be transmitted. When the voice activity confidence level 112 is low (e.g., below 20%) and the nuisance level 116 is high (e.g., above 80%), the transmit decision level 120 indicates that the audio input 110 is not to be transmitted. When the voice activity confidence level 112 is neither high nor low, the combiner 106 combines the voice activity confidence level 112 and the nuisance level 116 to generate the gain level 122. In general, the gain level 122 is calculated according to the aggregate of the nuisance level 116 over time, given the voice activity confidence level 112.

One option is for the combiner 106 to perform a linear combination of the voice activity confidence level 112 and the nuisance level 116. For example, when the voice activity confidence level 112 is 50% and the nuisance level is 20%, the gain level 122 may be 40%. (A gain of 40% means that the level of the modified audio input 320 is 40% of the level of the audio input 110.) As another example, when the voice activity confidence level 112 is 50% and the nuisance level is 80%, the gain level 122 may be 10%. In these examples, the gain level is computed as the voice activity confidence level times the remainder of 100% minus the nuisance level.

When the nuisance level 116 is multiple nuisance levels (e.g., resulting from the aggregation of events from multiple auxiliary sources), the combiner 106 may first combine the multiple nuisance levels into a combined nuisance level (using either a linear combination, a maximum, etc.), and then perform a linear combination of the combined nuisance level and the voice activity confidence level 112.

As discussed above, the combiner 106 may also account for the far end activity level 130 when generating the voice activity confidence level 112 and the nuisance level 116. According to an embodiment, the far end activity level 130 may be a binary value. When the far end activity level 130 is high, the combiner 106 may apply a reduction (e.g., 20%) to the voice activity confidence level 112 and to the nuisance level 116. When the far end activity level 130 is low, the combiner 106 may combine the voice activity confidence level 112 and the nuisance level 116 normally.

According to another embodiment, the far end activity level 130 may range between 0 and 1. When the far end activity level 130 is low (e.g., below 0.2), the combiner 106 may operate as described above regarding the "0" binary value. When the far end activity level 130 is high (e.g., above 0.8), the combiner 106 may operate as described above regarding the "1" binary value. When the far end activity level 130 is neither low nor high (e.g., between 0.2 and 0.8), the combiner 106 may apply a linear reduction (e.g., reaching a maximum of 20% when the far end activity level 130 is at 0.8) to the voice activity confidence level 112 and to the nuisance level 116.

Example Embodiments

One example embodiment is a laptop computer used in a teleconferencing environment. The laptop computer has a fan and a keyboard as its auxiliary components 312 (see FIG. 3). The aggregator 104 (see FIG. 1) aggregates the auxiliary input 114 from the fan into a first nuisance level in the range [0, 1], aggregates the auxiliary input 114 from the keyboard into a second nuisance level in the range [0, 1], and provides a linear combination of the two as the nuisance level 116 to the combiner 106.

Another example embodiment is a teleconferencing endpoint, e.g. a speakerphone. The speakerphone has an accelerometer and a vibration sensor as its auxiliary components 312 (see FIG. 3). The aggregator 104 (see FIG. 1) aggregates the auxiliary input 114 from the accelerometer into a first nuisance level in the range [0, 1], aggregates the auxiliary input 114 from the vibration sensor into a second nuisance level in the range [0, 1], and provides the maximum of the two as the nuisance level 116 to the combiner 106.

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

Various aspects of the present invention may be appreciated from the following enumerated example embodiments (EEEs):

1. A method of transmission control for an audio device, the method comprising:
   receiving an audio input using a microphone;
   receiving an auxiliary input using a source other than the microphone;
   performing voice activity detection on the audio input to generate a voice activity confidence level;
   aggregating the auxiliary input over time to generate a nuisance level; and
   combining the voice activity confidence level and the nuisance level to generate a transmit decision level and a gain level.

2. The method of EEE 1, further comprising, when the transmit decision level indicates a transmission:
   applying the gain level to the audio input to result in a modified audio input; and
   transmitting the modified audio input.

3. The method of any one of EEEs 1-2, wherein the auxiliary input is a plurality of auxiliary inputs, and wherein the source other than the microphone is a plurality of sources other than the microphone.

4. The method of any one of EEEs 1-3, wherein the source other than the microphone is one of a vibration sensor, a system event log, an accelerometer, a component activity log, and a secondary input log.

5. The method of EEE 4, wherein the system event log logs keyboard press events and mouse click events.

6. The method of EEE 4, wherein the audio device includes a fan, and wherein the component activity log logs a fan speed of the fan.

7. The method of EEE 4, wherein the secondary input log logs information related to a connected device that is connected to the audio device.

8. The method of any one of EEEs 1-7, wherein combining the voice activity confidence level and the nuisance level includes:
   combining the voice activity confidence level, the nuisance level and a far end activity level to generate the transmit decision level and the gain level.

9. The method of any one of EEEs 1-8, wherein the gain level is a linear combination of the voice activity confidence level and the nuisance level.

10. The method of any one of EEEs 1-9, wherein the nuisance level is a plurality of nuisance levels.

11. The method of EEE 10, wherein the gain level is a linear combination of the voice activity confidence level and the plurality of nuisance levels.

12. A non-transitory computer readable medium storing a computer program that, when executed by a processor, controls an apparatus to execute processing including the method of any one of EEEs 1-11.

13. An apparatus for transmission control for an audio device, the apparatus comprising:
   a microphone;
   a source other than the microphone;
   a processor; and
   a memory,
   wherein the processor is configured to control the audio device to receive an audio input using the microphone,
   wherein the processor is configured to control the audio device to receive an auxiliary input using the source other than the microphone,
   wherein the processor is configured to control the audio device to perform voice activity detection on the audio input to generate a voice activity confidence level,
   wherein the processor is configured to control the audio device to aggregate the auxiliary input over time to generate a nuisance level, and
   wherein the processor is configured to control the audio device to combine the voice activity confidence level and the nuisance level to generate a transmit decision level and a gain level.

14. The apparatus of EEE 13, further comprising a transmitter, wherein when the transmit decision level indicates a transmission:
   the processor is configured to control the audio device to apply the gain level to the audio input to result in a modified audio input; and
   the processor is configured to control the transmitter to transmit the modified audio input.

15. The apparatus of any one of EEEs 13-14, further comprising:
   a plurality of sources other than the microphone, wherein the plurality of sources other than the microphone includes the source other than the microphone, and
   wherein the auxiliary input is a plurality of auxiliary inputs.

16. The apparatus of any one of EEEs 13-15, wherein the source other than the microphone is one of a vibration sensor, a system event log, an accelerometer, a component activity log, and a secondary input log.

17. The apparatus of any one of EEEs 13-16, further comprising:
a keyboard, wherein the source other than the microphone is a system event log that logs keyboard press events.

18. The apparatus of any one of EEEs 13-17, further comprising:
a fan, wherein the source other than the microphone is a component activity log that logs a fan speed of the fan.

19. The apparatus of any one of EEEs 13-18, wherein the processor is further configured to control the audio device to combine the voice activity confidence level, the nuisance level and a far end activity level to generate the transmit decision level and the gain level.

20. The apparatus of any one of EEEs 13-19, wherein the gain level is a linear combination of the voice activity confidence level and the nuisance level.

The invention claimed is:

1. A method of transmission control for an audio device, the method comprising:
receiving an audio input using a microphone;
receiving an auxiliary input using a source other than the microphone, wherein the auxiliary input captures an input other than the audio input, and wherein the auxiliary input is related to a sensor other than the microphone;
performing voice activity detection on the audio input to generate a voice activity confidence level;
detecting individual nuisance events present in the auxiliary input;
aggregating the nuisance events over time to generate a nuisance level; and
combining the voice activity confidence level and the nuisance level to generate a transmit decision level and a gain level.

2. The method of claim 1, further comprising, when the transmit decision level indicates a transmission:
applying the gain level to the audio input to result in a modified audio input; and
transmitting the modified audio input.

3. The method of claim 1, wherein the auxiliary input is a plurality of auxiliary inputs, and wherein the source other than the microphone is a plurality of sources other than the microphone.

4. The method of claim 1, wherein the source other than the microphone is one of a vibration sensor and an accelerometer.

5. The method of claim 1, wherein the source other than the microphone is one of a system event log, a component activity log, and a secondary input log.

6. The method of claim 5, wherein the system event log logs keyboard press events and mouse click events.

7. The method of claim 5, wherein the audio device includes a fan, and wherein the component activity log logs a fan speed of the fan.

8. The method of claim 5, wherein the secondary input log logs information related to a connected device that is connected to the audio device.

9. The method of claim 1, wherein combining the voice activity confidence level and the nuisance level includes:
combining the voice activity confidence level, the nuisance level and a far end activity level to generate the transmit decision level and the gain level.

10. The method of claim 1, wherein the gain level is a linear combination of the voice activity confidence level and the nuisance level.

11. The method of claim 1, wherein the nuisance level is a plurality of nuisance levels.

12. The method of claim 11, wherein the gain level is a linear combination of the voice activity confidence level and the plurality of nuisance levels.

13. A non-transitory computer readable medium storing a computer program that, when executed by a processor, controls an apparatus to execute processing including the method of claim 1.

14. An apparatus for transmission control for an audio device, the apparatus comprising:
a microphone;
a processor; and
a memory,
wherein the processor is configured to control the audio device to receive an audio input using the microphone,
wherein the processor is configured to control the audio device to receive an auxiliary input using a source other than the microphone, wherein the auxiliary input captures an input other than the audio input, and wherein the auxiliary input is related to a sensor other than the microphone,
wherein the processor is configured to control the audio device to perform voice activity detection on the audio input to generate a voice activity confidence level,
wherein the processor is configured to control the audio device to detect individual nuisance events present in the auxiliary input,
wherein the processor is configured to control the audio device to aggregate the nuisance events over time to generate a nuisance level, and
wherein the processor is configured to control the audio device to combine the voice activity confidence level and the nuisance level to generate a transmit decision level and a gain level.

15. The apparatus of claim 14, further comprising a transmitter, wherein when the transmit decision level indicates a transmission:
the processor is configured to control the audio device to apply the gain level to the audio input to result in a modified audio input; and
the processor is configured to control the transmitter to transmit the modified audio input.

16. The apparatus of claim 14, further comprising:
a plurality of sources other than the microphone, wherein the plurality of sources other than the microphone includes the source other than the microphone, and
wherein the auxiliary input is a plurality of auxiliary inputs.

17. The apparatus of claim 14, wherein the source other than the microphone is one of a vibration sensor and an accelerometer.

18. The apparatus of claim 14, wherein the source other than the microphone is one of a system event log, a component activity log, and a secondary input log.

19. The apparatus of claim 14, further comprising: a keyboard, wherein the source other than the microphone is a system event log that logs keyboard press events.

20. The apparatus of claim 14, further comprising: a fan, wherein the source other than the microphone is a component activity log that logs a fan speed of the fan.

21. The apparatus of claim 14, wherein the processor is further configured to control the audio device to combine the voice activity confidence level, the nuisance level and a far end activity level to generate the transmit decision level and the gain level.

22. The apparatus of claim 14, wherein the gain level is a linear combination of the voice activity confidence level and the nuisance level.

\* \* \* \* \*